July 31, 1923.
J. H. FUNK
1,463,261
COMPRESSION COUPLING
Filed Aug. 20, 1920
Fig. 1.
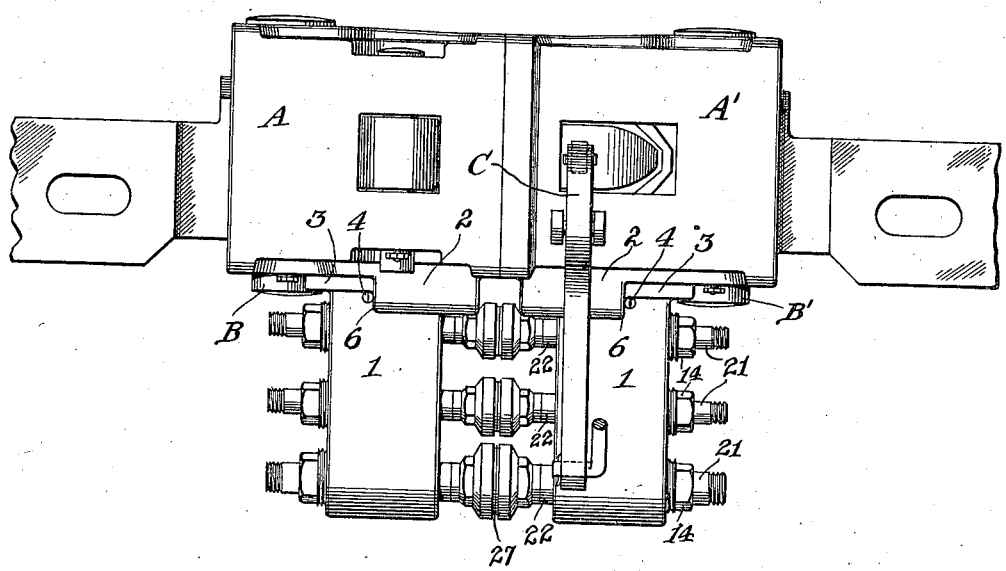
Fig. 2.
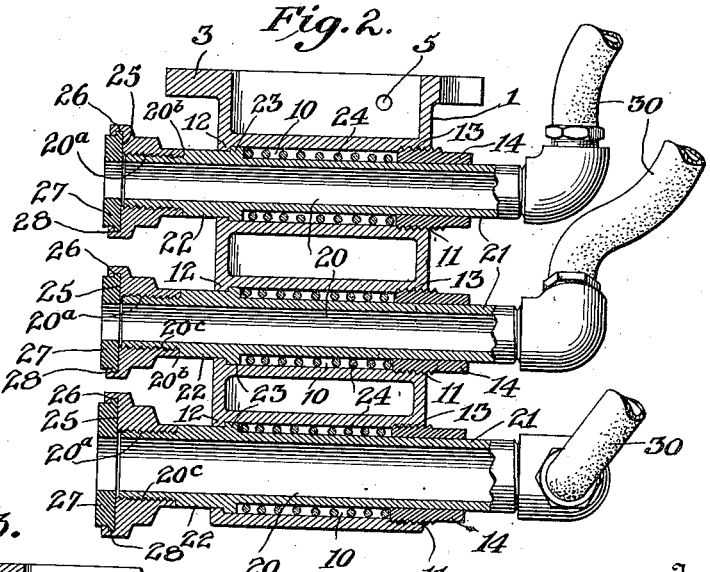
Fig. 3.
Inventor
John H. Funk
By Mason Fenwick & Lawrence,
Attorneys Patented July 31, 1923.

1,463,261

UNITED STATES PATENT OFFICE.

JOHN H. FUNK, OF LOUISVILLE, KENTUCKY, ASSIGNOR TO UNIVERSAL CAR AND HOSE COUPLER COMPANY, OF ST. LOUIS, MISSOURI, A CORPORATION OF ARIZONA.

COMPRESSION COUPLING.

Application filed August 20, 1920. Serial No. 404,725.

*To all whom it may concern:*

Be it known that I, JOHN H. FUNK, a citizen of the United States, residing at Louisville, in the county of Jefferson and State of Kentucky, have invented certain new and useful Improvements in Compression Couplings; and I do hereby declare the following to be a full, clear, and exact description of the invention, such as will enable others skilled in the art to which it appertains to make and use the same.

This invention relates in general to couplings, and more particularly to couplings for air and steam pipes arranged on cars designed to be attached to the car coupler so that when two cars come together the said pipe couplings automatically unite and form a continuous gas tight conduit.

This invention is an improvement upon the general type of couplings shown in an application of Onesime Hebert. Serial No. 205,103, filed December 3rd, 1917. In that application there is disclosed mating coupler heads each having a support depending from the lower side and carrying one or more pipe connections each having a compressible extension of rubber or other elastic material at the forward or coupling end, and so arranged that when two cars come together and the couplers interlock, the said elastic extensions meet, compress each other, and make a steam or air tight joint. In the said device the tubular sections are securely clamped in the depending carrier and reliance is had wholly upon the compressibility of the rubber or other elastic-material extensions for the elasticity necessary in order to make a tight compression joint. In use the elastic material (rubber or rubber composition) of the said couplings becomes unequally strained, and bulges out under compression in such manner that after standing coupled for a few days the rubber or like material tends to harden and set in distorted form and to lose some of its elasticity, resulting in imperfect connections.

In my improvement the elastic contact faces are not entirely depended on to afford the yielding action necessary to make a close connection. In this improvement the tubular section, instead of being rigidly secured in the depending supports, are mounted to slide longitudinally therein, and are pressed forward by a strong spring, the forward ends of the tubular sections carrying gaskets of yielding, elastic material held under normal condition of tension, which, when pressed into contact with a corresponding coupling device, form air and steam tight joints. In my device the chief yielding action is secured by means of the said steel spring, and there is no danger of deformations to which the prior device referred to is subject.

In the accompanying drawings, in which corresponding reference characters designate corresponding parts throughout the several views:

Figure 1 is a side elevation of a pair of car couplers showing my improvement attached;

Figure 2 is a vertical section through a depending support illustrating the structure of the improved coupling device;

Figure 3 is a modified form of one of the yielding couplings.

In said figures the improved coupling means is illustrated as attached to a car coupler of the type shown in an application of Onesime Hebert, Serial No. 118,103, filed September 21st, 1916. The drawing shows a pair of coupler heads A and A' coupled together and equipped with my improved devices, two corresponding or mating sets being illustrated in coupling relation or in the position assumed when two cars of a train are coupled together. C is a lever for releasing the couplings.

Detachably connected to the lower side of each coupler head is a supporting member 1, preferably mounted as shown. On the under side of each coupler is an undercut guideway 2. Formed on the upper end of the support 1 is a flange 3, said flange being guided in the guideways 2 on the under side of the coupler head. By means of this connection the support 1 may be detachably secured so that it may be removed by sliding it longitudinally of the coupler head toward the front thereof. When fixed in position the support 1 may be secured by any suitable means. In the embodiment herein disclosed the rear side of the flanged upper end of the support is in contact with the lower end of coupler pin B or B' and the support is prevented from moving forward by a movable pin 4 inserted in a hole 5 in the support 1 behind a shoulder 6 on a guide flange 2 formed on the lower side of the coupler.

The said supporting member 1 is preferably a steel casting although it is obvious it may be machined, if so desired.

In the embodiment illustrated, the support 1 is provided with three orifices 10 extending fore and aft therethrough to accommodate tubular spring coupling sections coupling the brake air, signal air and steam pipes of two cars of a train. The type of coupling illustrated, it will be apparent, is adapted for passenger cars. My invention, however, may be embodied in connection with a support having a single slidable spring coupling member, for, as is well known, in freight trains the steam pipe coupling is not generally used, the only necessary coupling being one for the air brake or train pipe, although in some instances freight cars are provided with a pipe for brake air and another for signal air. As shown in the drawings, the upper coupler section is that for the brake air pipe; the middle one is that for signal air and the lower one is that for the steam pipe. The steam pipe coupling is shown somewhat larger than the air pipe couplings in accordance with standard practice. Aside from different size and disposition in the holder or support 1 the construction of the several coupling devices is the same and a description of one will suffice for a description of all.

The orifices 10 formed through the support 1 are of uniform size from the rear end 11 to the annular shoulder 12 at the front end whereby the size of the orifice is reduced. The rear end 11 of each orifice is provided with screw threads 13, by which a hollow threaded spring-adjusting plug 14 may be removably and adjustably plugged into the orifice.

Guided in the orifice 10 and fitted easily in the smaller portion thereof within the annular shouldered end 12 and in the bore of the hollow adjusting plug 14 is a tubular coupling member 20. This coupling member, as shown in Figure 2, comprises a straight cylindrical portion 21 guided in the hollow adjusting plug 14, and a slightly larger straight cylindrical portion 22 guided in the reduced end of the orifice 10 formed by annular shoulder 12. On said coupling member 20 is an annular collar 23 adapted to bear against the inner face of the shoulder 12 to limit the forward motion of said tubular member. Between the collar 23 on the tubular member 20 and the inner end of the adjusting plug 14 a strong coil spring 24 surrounding said member thrusts it forward by its expansive force exerted between the adjusting plug 14 and said collar 23.

The forward or connector end of the member 20 is enlarged and its front face comprises a counterbored seat 25, which is undercut at 26, for the reception of a gasket 27. The gasket 27 is provided with an external annular rib or extension 28 which is adapted to fit within the undercut groove 26, the external dimensions of the gasket corresponding to the internal dimensions of the seat. By this construction the gasket 27 may be slightly compressed and forced to its seat whereupon it will expand so that the rib 28 will extend into the undercut portion 26 and the gasket will be held firmly in place without being under any strain or compression when not in contact with a corresponding coupling.

By means of the construction disclosed it will be apparent that any desired tension may be placed upon the spring 24 by suitably adjusting the threaded plug 14, and that said tension may be regulated with the greatest nicety. The gasket, being firmly seated and surrounded on its exterior by the wall of the metal, cuplike head of the tubular coupling member, is held firmly in place without being subjected to compression when uncoupled or injuriously distorted when coupled whereby the gasket is not likely to become so distorted as to cause imperfect union with a corresponding coupling element.

In the form of the invention illustrated in Figure 2 the tubular member 20 is threaded at 20$^a$ in advance of a shoulder 20$^b$ while the head of the coupler is provided with a corresponding female thread 20$^c$ whereby it may be united to the member 20. In order to remove the member 20 the head is unscrewed and the plug 14 removed, whereafter the member 20 may be withdrawn through the rear of the orifice 10.

In Figure 3 I have shown a modified form of coupling device 200 whereby the threaded connections between the head of the coupling member and the tubular body is done away with. In the form shown in Figure 3 the coupling member may be forged, cast or otherwise made in one piece. As illustrated a slight shoulder 203 is formed at the junction of the cylindrical parts 201 and 202 whereby that part of the coupler which is surrounded by the spring 24 is slightly smaller in diameter than that part which slides within the reduced portion of the orifice through the support 1. Over the smaller portion of said tubular member 200 a collar or washer 204 is loosely applied which fits up against the shoulder 203. By this construction the washer 204 serves as a thrust bearing for the front end of the coil spring 24 tending to keep the coupling member thrust to its forward limit. The coupling member 200 may be removed from the support 1 by unscrewing the adjusting plug 14 and drawing the coupling member forward, causing the washer or collar 203 and the spring 24 to slide over the end of the tubular member as the latter is drawn forward.

It will be understood that the rear ends of said slidable tubular coupling devices are adapted to be coupled to the usual flexible air or steam pipes 30 by the ordinary standard connecting devices now in use.

Having described my invention so as to enable those skilled in the art to which it appertains to make and use the same, what I claim and desire to secure by Letters Patent is as follows:

1. In a device of the class described, a support having a front and rear bearing, a tubular member slidable in the bearings of said support, a collar removably fitted over said tubular member against said front bearing, said tubular member having a yieldable forward end face, a spring housed within the support between said bearings and arranged to urge the tubular member forward and means to limit the effective action of the spring tending to force said tubular member forward.

2. In a device of the class described, a support having a cylindrical guiding orifice therethrough, the forward end of said orifice being reduced in size and forming a forward bearing, an internal shoulder, a hollow plug fitted in the opposite end of said orifice, a tubular member having a yieldable forward face guided in said plug and in said forward reduced portion, a removable collar on the tubular member adapted to engage said internal shoulder and a spring exerting its tension between said plug and collar on the slidable tubular member.

3. In a device of the class described, a support having a cylindrical guiding orifice therethrough providing an internal shoulder at one end, a hollow adjusting plug threaded in the other end, a tubular member having a yieldable forward face guided by said shouldered portion and said hollow plug, said tubular member having a removable collar adapted to engage said internal shoulder and a coil spring located between said adjusting plug and collar on the tubular member.

4. In a device of the class described, a support having a guiding orifice therethrough, the forward end of said orifice being reduced in size forming an internal shoulder, a hollow plug removably fitted in the opposite end of said orifice, a tubular member guided in said plug and in said forward reduced portion, said tubular member having an enlarged head at its forward end provided with a flexible engaging face, a cylindrical portion slidable within said reduced portion of the orifice, a reduced cylindrical portion rearward of the portion slidable in said reduced orifice, an abrupt shoulder at the junction of said two cylindrical portions, a collar removably fitted over said tubular member against said shoulder, and a spring surrounding said reduced cylindrical portion and exerting its tension between said plug and said collar.

In testimony whereof I affix my signature.

JOHN H. FUNK.